June 28, 1955   J. C. PHELPS ET AL   2,712,037
ELECTRONIC TRANSMITTER-DISTRIBUTOR
Filed May 7, 1953   4 Sheets-Sheet 1
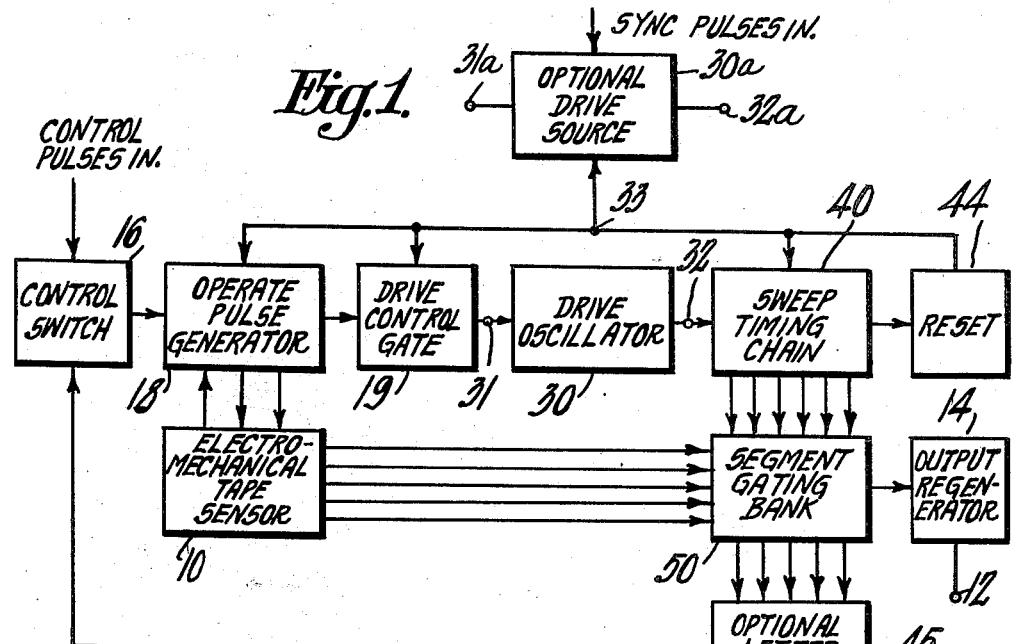
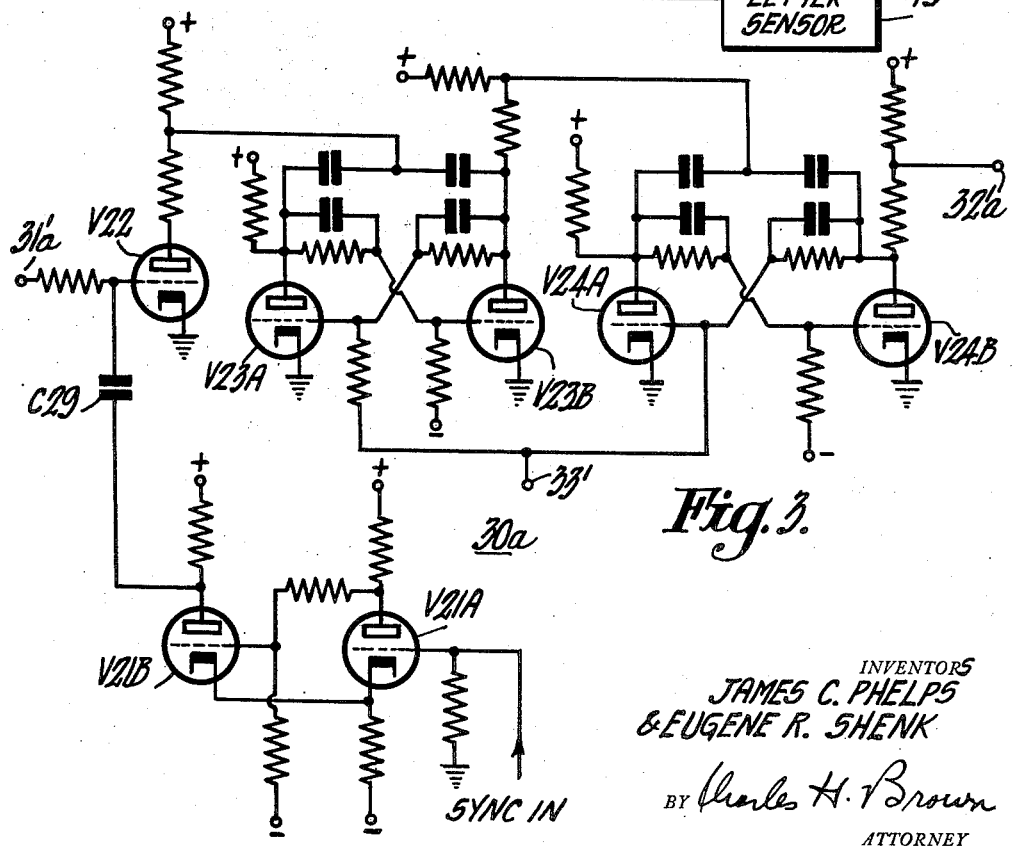
INVENTORS
JAMES C. PHELPS
& EUGENE R. SHENK
BY Charles H. Brown
ATTORNEY

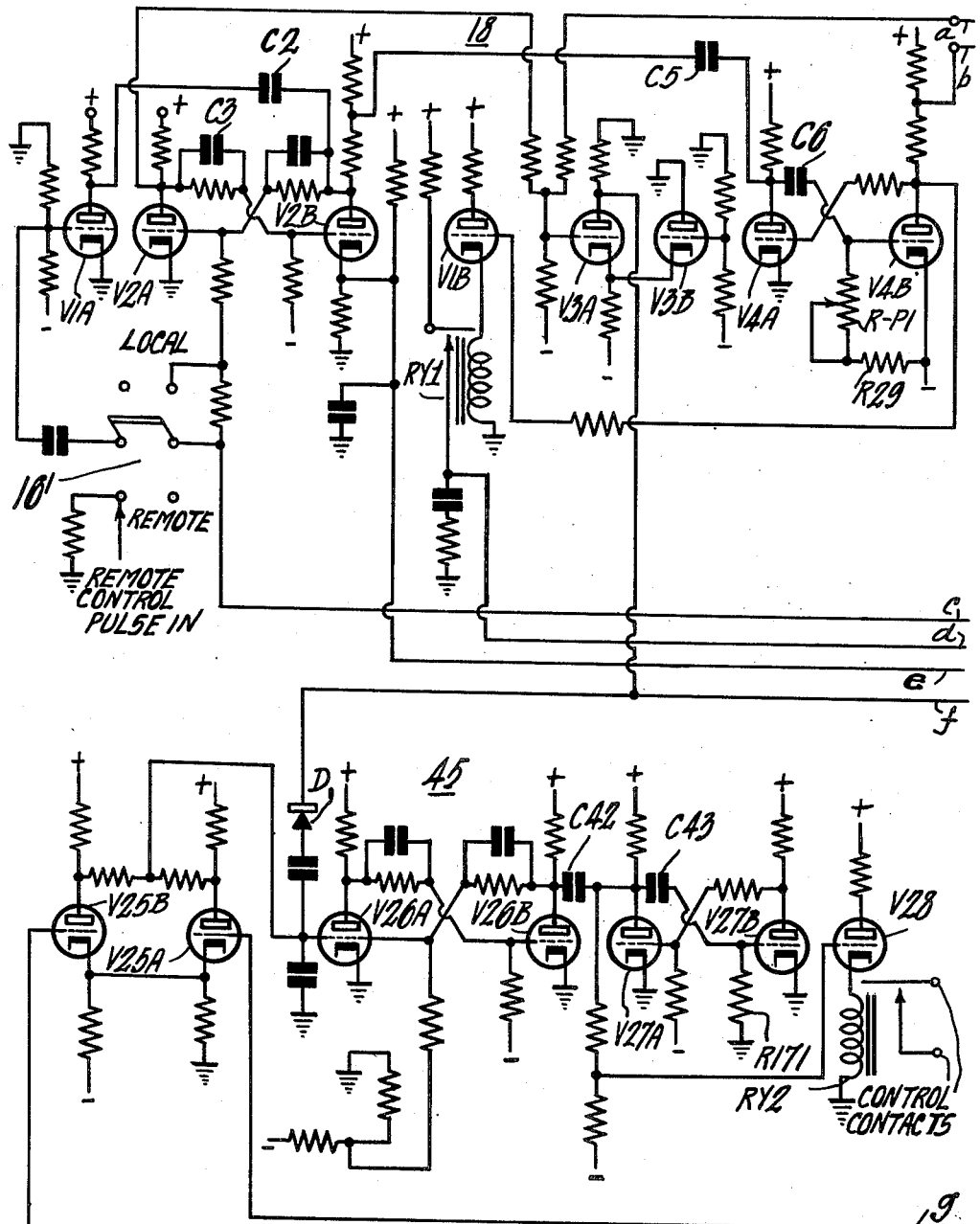
Fig. 2(a.)
INVENTORS
JAMES C. PHELPS
& EUGENE R. SHENK
BY Charles H. Brown
ATTORNEY

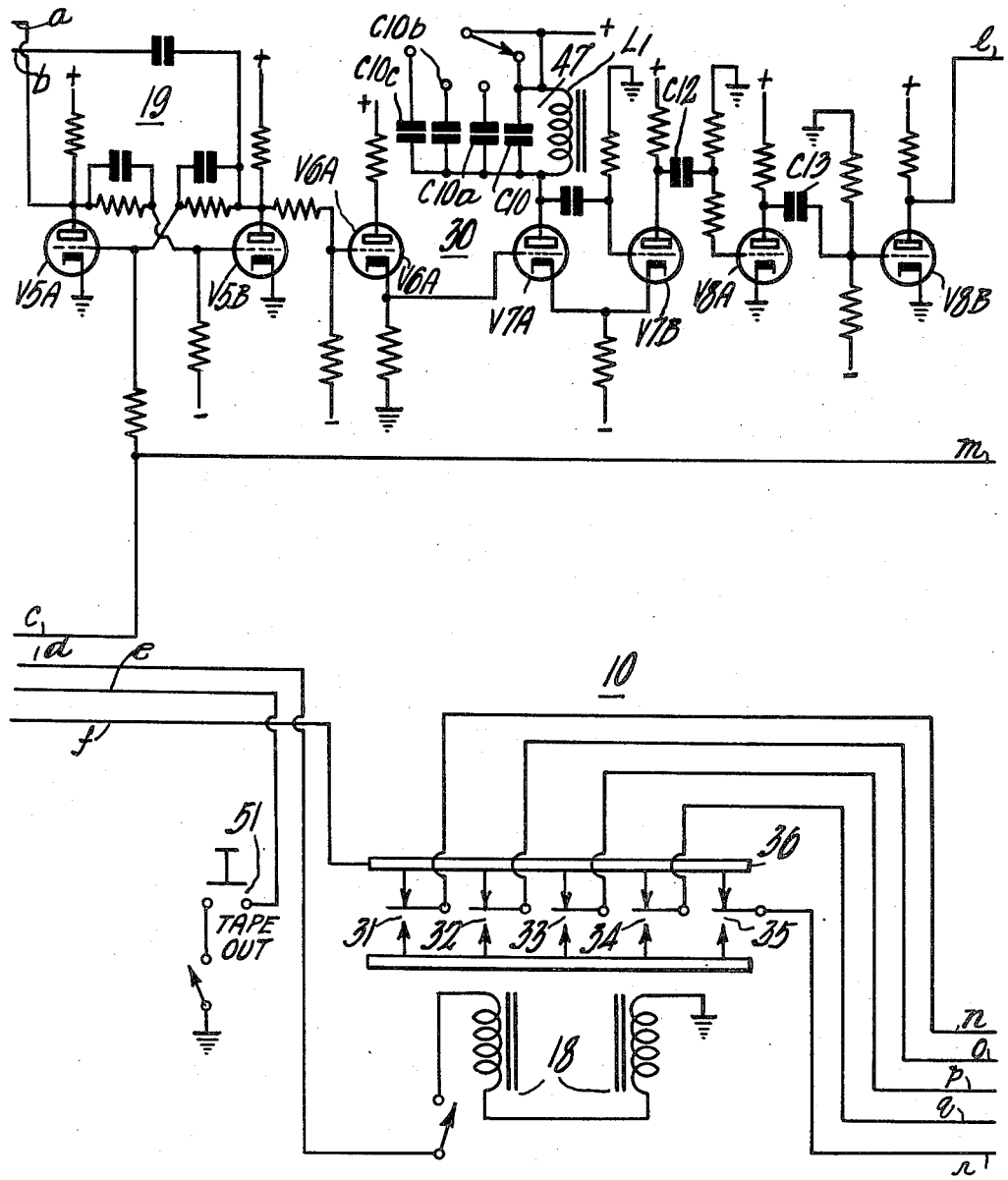

June 28, 1955  J. C. PHELPS ET AL  2,712,037
ELECTRONIC TRANSMITTER-DISTRIBUTOR
Filed May 7, 1953  4 Sheets-Sheet 4
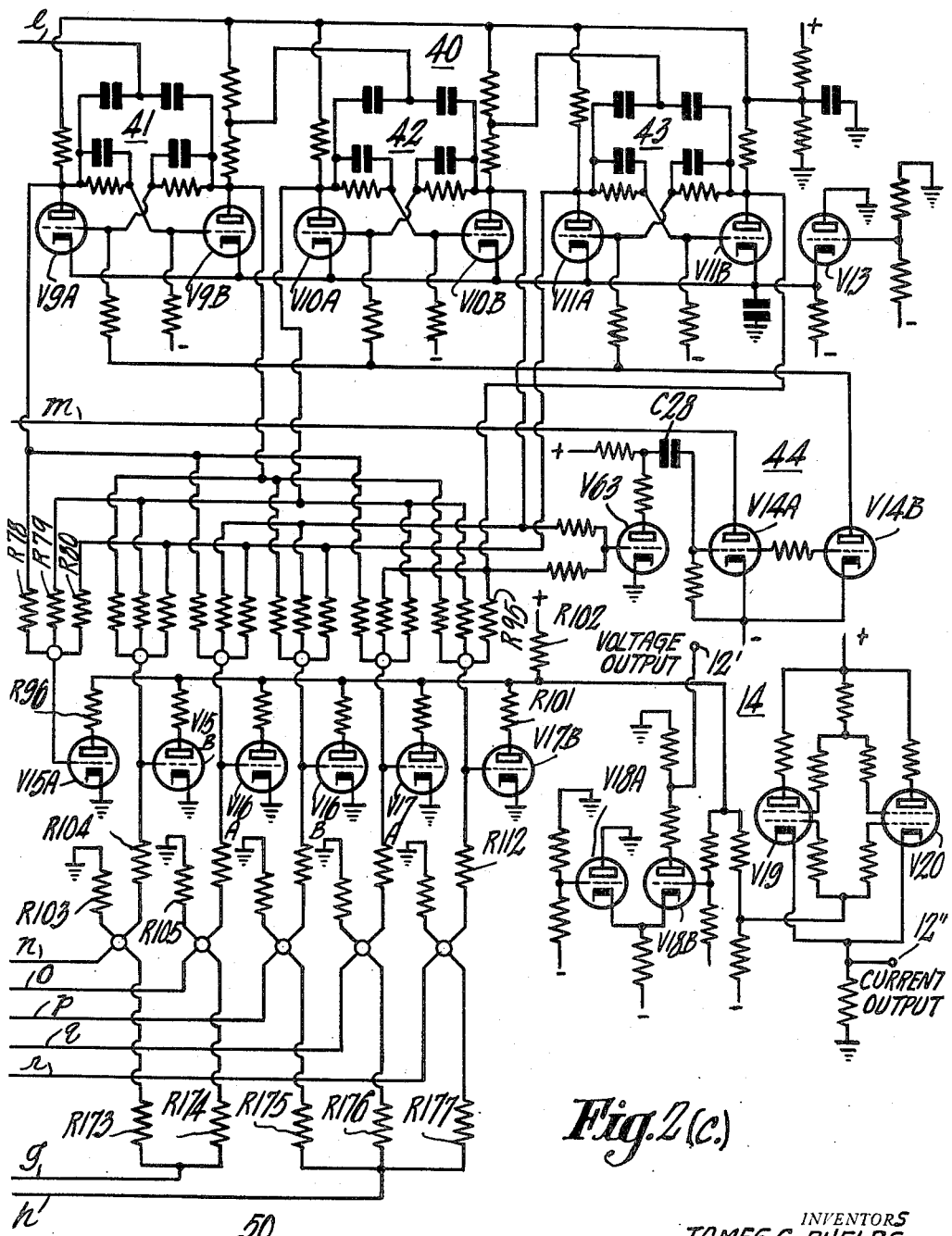
Fig.2(c.)
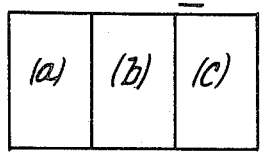
KEY TO FIG.2
INVENTORS
JAMES C. PHELPS
& EUGENE R. SHENK
BY Charles H. Brown
ATTORNEY United States Patent Office 2,712,037
Patented June 28, 1955

2,712,037

ELECTRONIC TRANSMITTER-DISTRIBUTOR

James Curtis Phelps, Woodcliff Lake, and Eugene Richard Shenk, Bergenfield, N. J., assignors to Radio Corporation of America, a corporation of Delaware Application May 7, 1953, Serial No. 353,556

The terminal 15 years of the term of the patent to be granted has been disclaimed 13 Claims. (Cl. 178—17)

The invention pertains to telegraph transmitting apparatus and particularly to tape sensing devices and electronic distributors therefor.

Transmitter-distributors are used in the telegraph art for assigning signal elements, usually established in the form of holes in a paper tape, presented at separate terminals, or over separate leads, to a single terminal, or lead, in timed sequence. As used hereinafter, a separate signal is construed to mean an $n$-element signal appearing over $n$ separate circuits with the elements presented simultaneously or sequentially element after element. An $n$-element simultaneous signal is construed to be one in which $n$ signal elements appear simultaneously on $n$ separate circuits, and a sequential signal is construed to be one in which $n$ elements appear on $n$ separate circuits element after element. A serial signal is construed to mean an $n$-element signal appearing element after element over a single circuit. A circuit arrangement for transposing from separate presentation to a serial presentation is referred to by those skilled in the art as a sep-ser arrangement. Similarly, circuit arrangements limited to simultaneous and serial presentations are familiarly termed sim-ser arrangements, and circuit arrangements specifically limited to sequential and serial presentation are familiarly called seq-ser arrangements.

These definitions are consistent with character sequential transmission because in this form of transmission, although usually occurring over a single physical circuit, each character is actually assigned to a separate channel of a time division multiplex communications system.

Conventional telegraphic communications practice utilizes a perforated paper tape for the intra-system recording, storage, and/or relaying of traffic intelligence. The commonly used methods of tape perforation sensing and subsequent distribution of that intelligence are essentially mechanical or electromechanical in operation. Mechanical actions involving mass of the physical body and forces acting thereon, in addition to the time intervals required to accomplish that action, have become impeding factors in the expanded use of these well-established devices. Higher transmission speeds, diversified control requirements and desire for interchangeability of basic functional assemblies have forced mechanical re-design to a point where the precision of initial manufacture and a high order of maintenance skill are paramount factors in continuous operation.

An object of the invention is to provide an improved electronically controlled and operated instrumentality for sensing the perforations in that tape and electronically distributing that sensed intelligence in such sequential time relationships and current or voltage magnitudes as are necessitated by the cooperating receiving devices used in conjunction therewith.

Another object of the invention is to provide an electronic circuit for telegraph signaling terminal equipment able to perform all of the functions of the mechanical counterpart without deleterious delays or excessive force or power requirements and, in addition, provide improved and novel means of control and methods of operation.

Still another object of the invention is to provide an electronic controlled tape sensor and distributor circuit arrangement for use on both simplex and multiplex telegraph systems.

A still further object of the invention is to provide such a circuit arrangement for use on either a start-stop or a synchronous basis, as desired.

Yet another object of the invention is to provide a distributor circuit arrangement by which additional channels may be accommodated in a telegraph signaling system by adding only a tape sensor and the associated control pulse generator for each channel to be added.

A more specific object of the invention is to provide a distributor circuit arrangement having means to change the duration of one timing interval while holding the other timing intervals constant.

More specific objects of the invention are to provide for rapid changes of speed of operation, variable element duration time and the accommodation of any number of elements per character desired.

The object of the invention together with the inherent advantages thereof are attained by a novel circuit arrangement comprising an operating pulse generator which delivers a pulse of controllable time duration to the tape advancing magnet of a mechanical tape sensor to advance the tape one character and deliver a pulse to a driving control gate opening the latter and applying potential to the common signal element bus of the tape sensor, and rendering a driving oscillator circuit operative to pulse a timing circuit at a predetermined frequency, thus producing a train of regularly time-spaced drive pulses which are applied to a plurality of segment gating devices which successively repeat signal elements applied thereto by the tape sensor or any other signal initialing means of equivalent nature to the output circuit.

According to specific embodiments of the invention monostable and bistable reciproconductive circuits, a start-stop oscillator circuit, electronic gating circuits and a timing chain are combined in novel array to perform the desired functions.

A special character sensor circuit may be incorporated into the circuit according to the invention to respond to a predetermined character and effect any control of the circuit desired upon receipt of that character. According to the specific embodiment of the invention, this character sensor is constituted by a plurality of control vacuum tubes arranged to trigger a bistable reciproconductive circuit when all of the tubes are in a given state of conduction, determined by the nature of signal elements applied to the input circuits of the control tubes. A monostable reciproconductive circuit is arranged to control the operation of a relay in response to the operation of the bistable reciproconductive circuit.

The invention will be described in terms of the functioning of the apparatus and of an express embodiment, given by way of example, with reference to the accompanying drawing forming a part of the specification and in which:

Fig. 1 is a functional diagram of a circuit arrangement according to the invention;

Fig. 2 is a schematic diagram of an embodiment of the invention as illustrated in Fig. 1; and Fig. 3 is a schematic diagram of a circuit arrangement for applying pulses from a source of synchronizing waves to the circuit arrangement according to the invention.

The overall functioning of the several elements of this invention may primarily be understood by reference to the functional diagram of Fig. 1. The 5-unit code is used by way of illustration only, as the principles disclosed are clearly applicable to codes containing a larger or smaller number of elements.

In the figure, a paper tape, produced by means not a part of the invention, is presumed to be in an electromechanical tape sensor 10, itself not a part of the invention, ready to have the intelligence contained in the perforations sensed and "read out" to a teleprinter or other utilization device attached at the terminal 12 to the output stage 14.

Upon receipt of a control pulse by the operate pulse generator 18, produced by equipment not forming a part of this invention, through a control switch 16, an operate pulse of controllable time duration is delivered to an advancing magnet of the tape sensor 10 causing that device to pull the tape sensing pins down out of contact in readiness for a tape advance of one character.

At the end of this controlled operate pulse two actions occur, simultaneous in origin but in time sequence as far as effect is concerned, as follows:

a. A pulse is delivered to a drive control gate 19, causing it to "open" with results to be described shortly.

b. The advance magnet de-energizes, advancing the tape one character distance, and, when that motion is completed, allows the tape sensing pins to come up into contact with the tape, being blocked on what is called "space" if no perforation exists, and allowed to rise to "mark" if a hole is encountered. This rise to "mark" position closes contacts which, as will be seen later, influence the reaction of a segment gating bank 50 comprising the several segment gates.

The opening of the drive control gate 19 is made to initiate two reactions, both of which are allowed to run continuously until this gate is closed, as follows:

a. A sensing potential is applied to the common "mark bus" of the tape sensor.

b. A drive oscillator 30 is made operative at some predetermined frequency and its output, having regularly spaced voltage transitions, is used to produce regularly spaced drive pulses to a sweep timing chain 40 comprising several binary stages 41—45.

The sweep timing chain 40 being driven by successive pulses from the drive oscillator 30 in regular consecutive order, is made to activate the successive segment gates of the segment gating bank 50 commencing with the so-called "start" segment.

These several segment gates are tied into a common circuit to the output stage 14 in such a manner that when all of the segment gates are inactive or blocked the output stage 14 is made steadily conducting. This results in a continuous state of mark at the output terminal 12 leading to an utilization device, in the form of a printer, reperforator, multiplex transmitter or the like.

Hence, whenever any one of the gates of the segment gating bank 50 is made conducting this output stage 14 is made to swing from marking to spacing, but only during the time interval over which that particular segment gate of the bank 50 is conducting.

In the specific embodiment hereinafter described, it is desirable that the first segment gate always produce a spacing condition of output, and the next succeeding segment gates be sequentially activated or not, depending upon the spacing or marking (that is, unperforated or perforated) condition of the sensing contacts of the tape sensor 10.

Accordingly each of the sensing contacts is connected to a respective segment gate so that if a mark perforation exists that particular segment gate is prohibited from becoming active when its regularly allotted time arrives.

This produces in the output regenerator 14 a time sequential indication of those sensing contacts which have been held on space because of there being no perforation in the tape.

At the end of the timing period for the last segment gate as the controlling timing chain 40 goes to the last desired condition, the transition is made to effect a "reset" stage 44 which restores the operate pulse generator 18, the drive control gate 19, and the sweep timing chain 40 to the initial or "closed" state. If the desired number of pulses from the timing chain 40 is equal to the number of pulses which the chain is capable of producing, the reset provisions are omitted.

Restoration of the operate pulse generator 18 renders the entire circuit arrangement dependent upon receipt of another remotely produced control pulse for further operation.

Restoration of the drive control gate 19 stops the drive oscillator 30, hence no more drive pulses are supplied to the sweep timing chain 40.

Restoration of the sweep timing chain 40 to the initial condition assures that it is in the proper starting position for subsequent operation.

It can be seen that the frequency of the drive oscillator 30 will determine the time and duration of the several sensing segments. If the segment time be multiplied by the number of segments (or signal elements) of the code under consideration, and that product subtracted from the time between the start transitions of the control pulse, the remainder will represent the inoperative or so-called "stop time" of the assembly. Thus, a discrete choice of drive frequency will permit a wide choice of "stop time" characteristics.

For example, "unity-stop" apparatus is operated with each of the seven time elements of equal length and the frequency of the drive oscillator 30 and the period of the operate pulse generator 18 are set to provide seven equal time elements. For "1.4 stop" apparatus the period of the operate pulse generator 18 is set to provide an "operate" pulse of required time duration and the frequency of the drive oscillator 30 is set to divide the remaining time into six equal parts.

During this stop time, immediately following receipt of a control pulse, the controllable time duration of the operate pulse delivered to the tape sensor permits phasing of that particular tape sensor so that it may have an identical instant of starting effectiveness with any other tape sensor that may be used in associated circuitry. This precise phasing capacity allows several tape sensors to work into a common bank of segment gates without deleterious broadening of the timing requirements thereof. Accordingly, parallel or "tandem" operation of several tape sensors is readily accomplished. Because, under certain conditions of "tandem" operation, one of the tape sensors has a special (e. g., automatic numbering) function to perform, a "letters sensor" reading circuit 45 may be added to the segment gating bank 50.

This "letters sensor" 45 is made to respond (in the illustrative case) to the single combination of perforations known as "Letters" in the 5-Unit Telegraph Code, wherein all sensed segments are marking. It does not respond to any other combination than that for which it may be designed. Whenever operated, however, this "letters sensor" 45 can effect a switching (through circuits not a part of the invention) between several selected tape sensors so that first one then another may control the assembly.

Another alternative circuit, an optional drive source 30a, connected at terminals 31, 32 and 33 may be used in place of the drive oscillator 30 in those cases where fully synchronous control and operation are necessary or desirable. When so used no control pulses as such are required, but a synchronizing pulse train must be externally supplied instead. Note that for either synchronous or non-synchronous operation each cycle is initiated anew at each character interval.

A control switch 16 is provided so that, if desired, no externally produced control pulses are required for the operation of the combination. When this control switch is in a "local" position, any closure of the tape sensor "tape out" sensing pin, or of the associated "on-off" switch produces the start transition of an operation cycle. Thereafter as long as both of these two control points remain closed, the conclusion of a preceding cycle is made to serve as the initiating impulse for a succeeding cycle.

A specific example of circuitry designed to accomplish all of the previously described functions when applied to a nominal 60 word per minute, 5-unit, start-stop telegraph code is shown in Fig. 2.

A magnetically advanced tape sensor 10 is used as the tape reading device, having "tape out" contacts 51 which are closed only when tape is actually in reading position, and five perforation sensing contact 31—35 which are closed to "mark" bus 36 whenever there is no tape to prohibit their closing. (This may be a perforation in the tape, or simply no tape at all.)

The operate pulse generator 16, consists of eight triodes V1A, V1B, V2A, V2B, V3A, V3B, V4A and V4B. The triode V1A is an input isolating tube normally cut off, which momentarily becomes conducting on the positive transition (front) of the remote control pulse. The coincident negative transition on the anode of the triode V1A is applied by way of a capacitor $C_2$ into a bistable reciproconductive circuit composed of a pair of triodes V2A and V2B.

As employed herein the term "reciproconductive circuit" is construed to include all two-tube regenerative devices in which conduction alternates in one or the other tube in response to applied triggering potential. The term "multivibrator" is sometimes applied to this circuit. The term "trigger circuit" is sometimes used to refer to the monostable reciproconductive circuit which is one requiring one trigger to change the conducting states, the restoration being automatic and the term "locking circuit" is sometimes applied to the bistable reciproconductive circuit which is one in which two triggers are required to switch from one stable state to the other and return.

In this reciproconductive circuit the triode V2A is normally conducting with the other triode V2B cut off thereby. Upon receipt of a negative transition from the input triode V1A, the one triode V2A is cut off causing the other triode V2B to conduct. This condition (the tube V2A off—the tube V2B on) prevails until, at reset time, the triode V2A is again made conducting thus cutting the triode V2B off.

The ability of the triode V2A to affect the tube V2B as described is conditional upon the state of the tape-out contacts 51 of the tape sensor 10. If these contacts 51 are open the tube V2A cannot cause the triode V2B to conduct as the cathode of the latter will be too "positive" for such action.

While the tube V2A is cut off the grid of another tube V3A will be held partially positive but not far enough for conduction to take place. This partial conditioning of the tube V3A will be referred to later.

Whenever the tube V2B is made conducting, the coincident negative transition at the anode thereof is effective, by way of a coupling capacitor C5 and a triode V4A in cutting off the triode V4B.

The triodes V4A and V4B comprise a trigger or monostable reciproconductive circuit; the tube V4B being normally conducting with the other tube V4A cut off thereby.

Upon receipt of a negative transition from the tube V2B, the triode V4B is cut off for a time interval governed by the capacitor C6 and an adjustable potentiometer RP1 in the grid circuit. While the tube V4B is cut off both the tube V4A and tube V1B are held conducting.

The triode V1B governs the operate pulse to the tape advance magnet 18 of the tape sensor 10. As shown, unregulated D. C. line power is applied to the tape advance magnet 18 by way of the contacts of a relay RY1 in order to reduce the needed capacity of the + D. C. rectifier. If this be inconsequential the magnet may be interposed directly in the cathode of the tape advancing pulse tube V1B, using an appropriate tube type therefor.

When the operate pulse generator output tube V4B resumes its normal conducting state the negative transition at the anode of the tube is used to trigger the drive control gate input tube V5A to cut off.

The drive control gate triodes V5A and V5B comprise a locking or bistable reciproconductive circuit, with the input tube V5A normally conducting and the output tube V5B cut off thereby.

While the tube V5A is cut off the grid of the tube V3A is held partially positive and this partial conditioning when added to that previously applied by way of the tube V2A as described above is now sufficient to make the tube V3A conducting.

The tube V3A with the tube V3B is used to supply keying or sensing potential to the "mark" bus 36 of the tape sensor 10. The triode V3B is always conducting and serves to hold the cathode potential of the tubes constant regardless of the state of conduction of the triode V3A. In this sense the tube V3B is a regulator of the sensing potential.

When the drive control gate 19 has been thus "opened," that is, the tube V5A triggered off and the tube V5B on, it remains "open" until restored to the initial condition at the reset time. While the tube V5B is conducting (gate open), the grid of the drive oscillator control tube V6A is held sufficiently negative to block it.

Five triodes V6A, V7A, V7B, V8A and V8B and associated components constitute the drive oscillator 30. The control tube V6A governs the ability of the oscillator V7A—V7B to function. Normally, with the control tube V6A conducting, the grid of the tube V7A is held comparatively highly positive. In this condition both the tubes V7A and V7B are conducting.

When the drive control gate 19 is opened, and the tube V5B conducts the grid of the control tube V6A goes sufficiently negative to cut off the tube, thus making the grid of the oscillator tube V7A drop downward in a less positive direction.

As the grid of the oscillator tube V7A is thus freed of saturating positive potential, the tubes V7A and V7B conduct in such fashion to produce oscillations under the control of a tuned circuit 47 comprising an inductor L and adjustable capacitor C10. This oscillator is a modification of the configuration covered by U. S. Patent 2,269,417 to M. G. Crosby and that disclosed in U. S. patent application Serial No. 266,386, filed January 14, 1952, to A. Liguori now U. S. Patent 2,685,613 dated Aug. 3, 1954. The capacitor C10 is set for the highest frequency expected to be used and additional capacitors C10a, C10b, C10c, etc. are chosen to establish those lower frequencies that may be called for under different modes of operation.

The oscillator action is such that immediately following the cutting off of the control tube V6A, a normally conducting triode V8A is pulsed off once with each cycle of the oscillator by way of a coupling capacitor C12.

This pulse cut-off of the triode V8A produces pulsed conduction of normally cut-off triode V8B by way of another coupling capacitor C13. Thus, the anode of the tube V8B is made to produce sharp negative transitions, one for each cycle of the drive oscillator 30, which are applied to the sweep counting chain in regularly timed intervals.

Six triodes V9A and V9B, V10A and V10B, V11A and V11B are used in a conventional binary counting or timing chain 40 comprising stages 41, 42, and 43, the triodes V9A, V10A and V11A of each stage being normally conducting. The respective anodes are resistance coupled for triple coincidence on the grids of tubes of the several segment gates 51—56 of the gating bank 50. A triode V13 regulates the cathode voltage of the timing tubes to insure pulse count stability of the binary stages 41—43.

The segment gates comprising tubes V15A, V15B, V16A, V16B, V17A and V17B are all normally cut off due to the coincidence connections to the binary stages 41—43. For example, consider the grid potential of the first segment gate V15A. A resistor R78 connects to the anode of the normally conducting tube V9A of the first binary stage 41 and so has relatively negative potential therefrom. Another grid coupling resistor R79 connects to the anode of the normally conducting tube V10A of the second binary stage 42 and so has relatively negative potential therefrom. A third coupling resistor R80 connects to the anode of the normally conducting tube V11A of the third binary stage 43 and so has relatively negative potential therefrom. Therefore, obtaining negative potential from three equal sources the grid of the first gate tube V15A is fully negative and the tube is cut off.

Upon application of the first transition from the drive oscillator 30 coincident with the starting thereof, to the timing chain 40, the triodes V9A, V10A and V11A, all initially conducting, are cut off, resulting in three equal and relatively positive potentials appearing on the grid of the first segment gate V15A and the tube is made conducting.

Upon receipt of the second transition from the drive oscillator 30, coincident with the start of its second cycle, only the triode V9A will switch from cut off to conducting, the triodes V10A and V11A remaining at cut off. Now one negative and two positive potentials are applied to the grid of the first gate V15A making it 33 per cent less positive, a sufficient negative swing to cause cut off. Hence, the first gating tube V15A is conducting only from the state of the first cycle of the drive oscillator 30 until the start of the second cycle thereof.

Similarly, and in turn, the second to sixth gating tubes, V15B—V17B, are rendered conducting during the second, third, fourth, fifth and sixth cycles of the drive oscillator 30. At the start of the seventh cycle the reset control triode V6B is similarly made conducting but the negative transition at the anode thereof, applied by way of a coupling capacitor C28 to the grids of the reset triodes V14A and V14B, immediately and momentarily blocks those normally conducting tubes. As the tube V14A normally supplies negative bias to the input tube V2A and to the drive control reciproconductive circuit tube V5A this momentary interruption of negative bias serves to restore both of those tubes to the original conducting state. Similarly the tube V14B, being momentarily cut off, restores the binary tubes V9A, V10A and V11A to the original conducting state.

Restoring the drive control gate tube V5A to the conducting state blocks the other tube V5B and thereby stops the drive oscillator 30. The tube V5A also cuts off the triode V3A thereby cutting sensing potential to the tape sensor contacts 31—36. Restoring the tube V2A to conducting re-establishes the original state of the operate pulse generator 16, and thus completes the cycle. The anodes of the segment gates V15A—V17B are all connected in parallel to the output stage 14.

Output triodes 18A and 18B are arranged to provide output signal potential. The tube V18A is a cathode voltage regulator for the tube V18B which is also normally conducting, supplying a negative marking potential to the output terminal 12'. During the time that any of the segment gates V15A—V17B are conducting the grid of the tube V18B goes negative and the tube is then blocked raising the potential at the terminal 12' from a negative to ground potential. Two parallel connected triodes V19A and V20 provide a current signal output at terminal 12". Parallel connected tubes are necessary only to supply the relatively high current required by the conventional printer circuit, and the anodes are connected to the unregulated positive D. C. power source to lower the rectifier capacity requirements.

A relay could be used to key this unregulated supply whereby a single tube of appropriate current carrying capacity to govern the relay would be sufficient.

The grids of the segment gates V15B—V17B have, in addition to their triple coincidence resistors to the sweep timing chain stages 41—43, a connection to the associated sensing contacts 31—35 of the tape sensor 10.

If one of these contacts be open, that is, at spacing signal element, only the binary stage conditions the corresponding gate and it will be conducting. However, if this sensor contact be closed, that is, on a marking signal element, then the gate cannot conduct, even when its binary timing is permissive for it to do so. Thus, all of the signal elements at the output are presumed to be marking, and only the spacing elements of the sensed character are used to change that state.

Since it is the cutting off of the triode V2A of the bistable reciproconductive circuit that actually initiates all of the subsequent cycle of events through to reset time, if the normal negative bias to that tube be increased so that at the end of reset period the tube is automatically turned off, a self-repeating cycle may be produced. The switch 16', when thrown to the "local" position is arranged to so increase the negative bias to the tube V2A to produce this effect and a new cycle is started immediately upon the expiration of the previous cycle.

It is well to point out that under this local cycling control the duration of the unstable state of the reciproconductive circuit comprising the tubes V4A and V4B determines the idle or "stop" time of the output signal train. Thus, the setting of the potentiometer R—P1, under local control, governs the self-cycling character rate, and under remote control, governs only the phase relationship of the stop time with respect to the external control pulse.

Should it be desirable to "read" a specific character set up in the tape senser—as for example, "Letters" or 5 marks sensed—the circuit comprising seven triodes V25A, V25B, V26A, V26B, V27A, V27B, and V28 is provided. The grid of the first tube V25A connects to the first two contacts and the grid of the second tube V25B connects to the last three contacts of the tape sensor pins 33—35 via the grids of gate tubes V15B—V17B and resistors R173, 174, 175, 176 and 177, respectively. The tube V25A is normally conducting and can be cut off only when the grid of the gating tube V15B and the grid of the tube V16A are at negative or marking potential. The tube V25B is normally conducting and can be cut off only when the grids of tubes V16B, V17A and V17B are simultaneously at negative or marking potential. Hence, both of the special sensor tubes V25A and V25B can be cut off only when a "letters" perforation is being read by the tape sensor 10.

When both of the special sensor tubes V25A and V25B are cut off, the junction of the coupling resistors R152, R153 is fully positive and this carries the grid of a triode V26A of a bistable reciproconductive or locking circuit to a conducting potential. As the tube V26A becomes conducting the other tube V26B in this reciproconductive circuit is blocked. The circuit so stays until a negative transition derived from the next following control pulse obtained from the anode of the tube V3A and applied by way of a diode D causes the tube V26A to be blocked. The tube V26B, rendered conducting because of this action, delivers a negative transition by way of a coupling capacitor C42, to cut off a tube V27B of a monostable reciproconductive circuit when the tube V27B is cut off and the tube V27A is rendered conducting. This condition is maintained under control of the network comprising a capacitor C43 and a resistor R171 for as long a period as is necesesary to effect control of a relay RY2 and of the circuits which the contacts of that relay control. In the circuit shown, the triode V28 is normally conducting, holding the relay RY2 operated and the contacts closed. However, as long as the tube V27A is conducting the tube V28 is blocked and accordingly the relay RY2 is de-energized during that time and the contacts are open. Other known relay control circuits, obviously, can be substituted for that shown.

Under certain conditions of control it is often desirable to have the frequency of operations fully controlled by some remotely produced synchronizing frequency wave. In such a case the controllable but independent frequency output of the previously described drive oscillator 30 may be inadequate and "optional drive source" 30 as shown in Fig. 1 may be substituted therefor between terminals 71 and 72.

The optional drive source as shown in Fig. 3 is based on the assumption that the synchronizing potential varies between ground and some negative value over its full amplitude and the sweep timing chain 40 is to be started on the seven step cycle on the first negatively sensed swing of the synchronizing frequency that occurs after the drive control gate 19 has been opened in the usual manner. Switch 16' is placed in the local position, two triodes V21A and V21B act as conditioners of the synchronizing frequency input, tube V22 is a control tube and four other tubes V23A and V23B, V24A and V24B constitute a two-stage frequency divider for dividing the input frequency by a factor of four. The input tube V21A serves to prevent the balance of the circuitry from influencing the synchronizing frequency source while responding to the potential swing thereof. The following tube V21B inverts the phase of the output of the input tube so that the transitions at the anode of the tube V21B are in the same phase sense as the input but of greater amplitude and sharpness.

The control triode V22 is governed by the state of the drive control gate 19. When this gate is closed, the control tube V22 is swamped "on" by a high positive bias, but when the gate 19 is opened this bias drops to a normally conducting value which can be readily pulsed off by the negative transitions derived from the phase inverter by way of a coupling capacitor C29. Under such "open gate" circumstances the anode of the control tube V22 is pulsed off and on once for each negative swing of the impressed frequency, producing synchronously timed drive pulses for stepping the two stage frequency divider.

The anode of the output tube V24B goes negative on the first cycle and every fourth cycle thereafter, delivering drive pulses to the sweep timing chain 40 until the reset stage 44 is activated, as previously described. Since the control switch 16' is in the "local" position the reset stage 44 automatically starts a succeeding operating cycle. Then, if the potentiometer R—P1 is set so that the timing of the reciproconductive circuit comprising the tubes V4A and V4B is more than three but less than four cycles of the synchronous frequency, the drive control gate 19 will be reopened in time to catch the transition of the fourth cycle and overall operation will continue in the exact phase in which it originally strated. Thus to accommodate any reasonable synchronizing frequency, it is necessary only to adjust the potentiometer R—P1 to make fully synchronous drive possible.

Although any type of vacuum tube or other controlled electron flow path device can be used in the circuit according to the invention by observing the fundamental laws of electronics, it is a definite advantage that all of the tubes as shown are of a single type.

The overall circuitry previously described constitutes the requirements of a single tape transmitter-distributor. Should a multiple tape transmitter-distributor be desired wherein the tape reading function is to be divided among several tape sensors with but one of them in control of the output at one time simple duplication of the tape sensor 10 and the operate pulse generator 18 for each tape reading position will satisfy the requirement, the other functional groups being made common to all. Some simple means of switching remote control pulse to the several operate pulse generators in accord with the intended distribution plan will be needed but such switching means are known to the art and will offer no difficulty of application.

The following values were used for pertinent component parts of a circuit arrangement as shown in Fig. 2 for operation at 42 6/7 C. P. S. Obviously, other values can be used for other speeds.

Tubes ............................................ all type 5963
Diodes ........................................... all type 1N34

Resistors:
| Ref. Nr. | | Value |
| --- | --- | --- |
| R29 | kilohms | 470 |
| R78–95 | megohms | 4.7 |
| R96–101 | kilohms | 1 |
| R102 | do | 270 |
| R103–112 | megohms | 4.7 |
| R152–153 | do | 1 |
| R171 | do | 1 |
| R173-177 | do | 4.7 |
| R—P1 | kilohms | 500 |

Inductor:
| Ref. Nr. | | Value |
| --- | --- | --- |
| L1 | henries | 12 |

Capacitors:
| Ref. Nr. | Value |
| --- | --- |
| C2 | 0.00005 μfd. |
| C3 | 0.0001 μfd. |
| C5 | .0005 μfd. |
| C6 | 0.01 μfd. |
| C10 | To resonate with inductor L1 at 42 6/7 C. P. S. |
| C12 | 0.02 μfd. |
| C13 | 0.01 μfd. |
| C28 | 0.0005 μfd. |
| C29 | 0.0001 μfd. |
| C42 | 0.0001 μfd. |
| C43 | 0.01 μfd. |

The invention claimed is:

1. An electronic circuit arrangement for distributing intelligence expressed in separate form to an output circuit in serial form including an electro-mechanical tape sensor having a tape advancing magnet and a plurality of sensing devices, an operate pulse generator arranged to produce an operate pulse of controllable time duration in response to an applied control pulse, means to apply said operate pulse to said tape advancing magnet to ready said tape-sensing devices for the subsequent operation and upon completion of said operate pulse to advance said tape, a drive oscillator arranged to oscillate at a predetermined frequency and having an output network delivering uniformly spaced drive pulses, a drive control gate coupled to said operate pulse generator to be activated in response to said operate pulse to apply a sensing potential to said tape sensing devices of said tape sensor and to start said drive oscillator, a counting circuit coupled to said drive oscillator and having a reset circuit, a plurality of segment gates each having a signal element input circuit coupled to one of said tape sensing devices and to said counting circuit, said counting circuit conditioning said segment gates in succession for actuation by said tape sensing devices in a given mode of operation, and an output circuit common to all of said segment gates, said reset circuit being coupled to the last of said segment gates to restore said operate pulse generator, said drive control gate and said counting circuit to the initial condition thereby to stop said drive oscillator, the frequency of said drive oscillator being variable whereby the time duration of the last signal element is adjustable.

2. An electronic circuit arrangement for distributing intelligence expressed in separate form to an output circuit in serial form, including an electro-mechanical tape sensor having a tape advancing magnet and a plurality of tape sensing devices, an operate pulse generator arranged to produce an operate pulse of controllable time duration in response to an applied control pulse, means to apply said operate pulse to said tape advancing magnet to ready said tape-sensing devices for the subsequent operation and upon completion of said operate pulse to advance said tape, a drive oscillator arranged to oscillate at a predetermined frequency and having an output network delivering uniformly spaced drive pulses, a drive control gate coupled to said operate pulse generator to be activated in response to said operate pulse to apply a sensing potential to said tape-sensing devices of said tape sensor and to start said drive oscillator, a counting circuit coupled to said oscillator and having a reset circuit, a plurality of segment gates each having a signal element input circuit coupled to one of said tape sensing devices and to said counting circuit, said counting circuit conditioning said segment gates in succession for actuation by said tape-sensing devices in a given mode of operation, and an output circuit common to all of said segment gates, said reset circuit being coupled to the last of said segment gates to restore said operate pulse generator, said drive control gate and said counting circuit to the initial condition thereby to stop said drive oscillator.

3. An electronic circuit arrangement for distributing intelligence recorded in a paper tape to an output circuit as a train of electric pulses, including an electro-mechanical tape sensor having a tape advancing magnet and a plurality of tape-sensing pins, an operate pulse generator arranged to produce an operate pulse of controllable time duration in response to a synchronizing pulse, means to apply said operate pulse to said tape advancing magnet to ready said tape-sensing pins for the subsequent operation and upon completion of said operate pulse to advance said tape, a drive oscillator arranged to oscillate at a predetermined frequency and having an output network delivering uniformly spaced drive pulses, a drive control gate coupled to said operate pulse generator to be activated in response to said operate pulse to apply a sensing potential to said tape sensing pins of said tape sensor and to start said drive oscillator, a binary counting chain coupled to said drive oscillator and having a reset circuit, a plurality of segment gates each having a signal element input circuit coupled to one of said tape sensing pins and to said binary counting chain, said binary counting chain conditioning said segment gates in succession for actuation by said tape-sensing pins in a given mode of operation, and an output circuit common to all of said segment gates, said reset circuit being coupled to the last of said segment gates to restore said operate pulse generator, said drive control gate and said binary counting chain to the initial condition thereby to stop said drive oscillator, the frequency of said drive oscillator being variable whereby the time duration of the last signal element is adjustable.

4. An electronic circuit arrangement for distributing intelligence received in separate form to an output circuit in serial form, including a tape sensor having a tape-stepping magnet, means to recognize a control pulse, means to block said control pulse recognizing means until a full cycle of operations is completed, a start-stop oscillator operated in response to the control pulse to produce a cyclic wave of predetermined number of cycles, a timing pulse producing chain coupled to said start-stop oscillator, a plurality of output gates coupled to and conditioned by said timing pulse producing chain, a monostable reciproconductive circuit interposed between said blocking means and said start-stop oscillator and having an adjustable time constant for varying the time duration of the stop signal element whereby at the conclusion of this time interval the start-stop oscillator is started to drive the timing chain, means to apply a control pulse to said magnet to step the tape in response to the operation of said blocking means, means to apply sensing potential to the tape sensor, means responsive to the conclusion of each timing interval to step the tape for one character thereby to derive an element potential and apply the same to the corresponding output gate, means operative during the second and later cycles of oscillation to open the corresponding output gates due to coincidence of marking potential and the conditioning of each output gate by the corresponding stage of said timing chain, and means responsive to the last cycle to reset said timing chain, cut said oscillator off and reset said blocking means in readiness for the succeeding control pulse.

5. An electronic circuit arrangement for distributing intelligence received in separate form to an output circuit in serial form, including means to produce a control pulse, means to block said pulse producing means until a full cycle of operations is completed, a start-stop oscillator operated in response to said control pulse to produce a cyclic wave of predetermined number of cycles, a timing pulse generating chain coupled to said start-stop oscillator, a plurality of output gates coupled to and conditioned by said timing pulse generating chain, a drive control gate interposed between said blocking means and said start-stop oscillator and having an adjustable time constant for varying the time duration of the stop signal element, whereby at the conclusion of this time interval the start-stop oscillator is started to drive the timing pulse generating chain, means responsive to the conclusion of each timing interval to derive a signal element potential and apply the same to the corresponding output gate, means operative during the second and later cycles of oscillation to open the corresponding output gates due to coincidence of marking potential and the conditioning of each output gate by the corresponding stage of the timing pulse generating chain and means responsive to the last cycle to reset said timing pulse generating chain, cut said oscillator off and reset said blocking means in readiness for the succeeding control pulses.

6. An electronic circuit arrangement for distributing intelligence established in separate form to an output circuit in serial form including an operate pulse generator arranged to produce an operate pulse controllable time duration in response to an applied control pulse, a drive oscillator arranged to oscillate at a predetermined frequency and having an output network delivering uniformly spaced drive pulses, means to apply said operate pulse to said drive oscillator to activate the same, an electronic counting circuit coupled to said drive oscillator and having a reset circuit, a plurality of segment gates each having a signal element input circuit to which one of the separately established elements of intelligence is applied and which is connected to said counting circuit, said counting circuit conditioning said segment gates in succession, and an output circuit common to all of said segment gates, said reset circuit being coupled to the last of said segment gates to restore said operate pulse generator and said counting circuit to the initial condition thereby to stop said drive oscillator, the frequency of said drive oscillator being variable.

7. An electronic circuit arrangement as defined in claim 6 and wherein a said electronic counting circuit comprises a plurality of electron discharge tubes arranged in a timing chain having stages operating continuously in timed succession, said segment gates each comprise a gating tube including an anode, a cathode and a control grid, the control grid of each of said gating tubes being connected to the output of a stage of said timing chain, said separately established signal elements being applied to the control grids of said gating tubes.

8. An electronic circuit arrangement for distributing intelligence established by signal initiating means in separate form to an output circuit in serial form, including an operate pulse generator arranged to produce an operate pulse of controllable time duration in response to an applied control pulse, means to apply said operate pulse to said signal initiating means to ready the same for the subsequent operation, a drive oscillator coupled to said operate pulse generator to be activated in response to said operate pulse and arranged to oscillate at a predetermined frequency and having an output network delivering uniformly spaced drive pulses, a counting circuit coupled to said drive oscillator and having a reset circuit, a plurality of segment gates each having a signal element input circuit coupled to said signal initiating means and to said counting circuit, said counting circuit conditioning said segment gates in succession for actuation by said signal initiating means in a given mode of operation, said reset circuit being coupled to the last of said segment gates to restore said operate pulse generator and said counting circuit to the initial condition thereby to stop said drive oscillator.

9. An electronic circuit arrangement as defined in claim 8 and wherein said plurality of segment gates each includes a gating tube having an anode, a cathode, and a grid, the grid of each of said gating tubes being biased in accordance with a signal impulse produced by said signal initiating means, said counting circuit comprising an electronic commutator having a plurality of tubes operating in timed succession, the grids of said gating tubes being further biased by said electronic commutator to cause the ones of said electronic gating tubes whose grids are biased to be rendered conducting, and means coupled to said electronic gating tubes to transmit signals over a common signaling channel.

10. An electronic circuit arrangement as defined in claim 8 and wherein said signal initiating means comprises a plurality of tape-sensing elements and said plurality of segment gates each comprise an electronic gating tube having at least an anode, a grid and a cathode, means interconnecting individual ones of said tape-sensing elements with the grids of individual ones of said gating tubes for conditioning said tubes for operation, said counting circuit comprising an electronic distributor having a plurality of bistable reciproconductive circuits connected in cascade, means connecting the grids of said gating tubes with individual ones of said reciproconductive circuits for successively operating conditioned ones of said plurality of electronic gating tubes, a signaling channel, and a signal regenerator coupled in common to said electronic gating tubes for transmiting code impulses over said signaling channel.

11. An electronic distributor, including a monostable reciproconductive circuit having an element adjustable to select a desired time period of unstable condition of conduction from a range of such periods, a start-stop oscillator coupled to said monostable reciproconductive circuit and arranged to oscillate upon the restoration of said monostable reciproconductive circuit to the reciprocal condition of conduction, an electronic counting chain coupled to said start-stop oscillator, said counting chain having a reset circuit coupled to said monostable reciproconductive circuit and to said start-stop oscillator to trigger said monostable reciproconductive circuit to the unstable condition of conduction and to stop said oscillator after a predetermined number of cycles have been generated by said oscillator, said oscillator having a component adjustable to select a desired frequency from a range of said frequencies, thereby to establish one time period of adjustable duration and a predetermined number of time periods of predetermined duration in each cycle of operation.

12. An electronic distributor, including a monostable reciproconductive circuit having an element adjustable to select a desired time period of unstable condition of conduction from a range of such periods, a bistable reciproconductive circuit connected to said monostable reciproconductive circuit, a start-stop oscillator coupled to said bistable reciproconductive circuit and arranged to oscillate upon the triggering of the bistable reciproconductive circuit by the restoration of said monostable reciproconductive circuit to the reciprocal condition of conduction, a binary counting chain coupled to said start-stop oscillator, said counting chain having a reset circuit coupled to said monostable and bistable reciproconductive circuits to retrigger said monostable reciproconductive circuits to the unstable condition of conduction and to stop said oscillator after a predetermined number of cycles have been generated, thereby to establish one time period of adjustable duration and a predetermined number of time periods of predetermined duration in each cycle of operation.

13. An electronic circuit arrangement for distributing intelligence recorded in a paper tape to an output circuit as a train of electric pulses, including an electromechanical tape sensor having a tape advancing magnet and a plurality of tape-sensing pins, an operate pulse generator arranged to produce an operate pulse of controllable time duration in response to a synchronizing pulse, means to apply said operate pulse to said tape advancing magnet to ready said tape-sensing pins for the subsequent operation and upon completion of said operate pulse to advance said tape, a drive oscillator coupled to said operate pulse generator, to be activated in response to said operate pulse and arranged to oscillate at a predetermined frequency and having an output network delivering uniformly spaced drive pulses, a binary counting chain coupled to said drive oscillator and having a reset circuit, a plurality of segment gates each having a signal element input circuit coupled to one of said tape-sensing pins and to said binary counting chain, said binary counting chain conditioning said segment gates in succession for actuation by said tape-sensing pins in a given mode of operation, and an output circuit common to all of said segment gates, said reset circuit being coupled to the last of said segment gates to restore said operate pulse generator and said binary counting chain to the initial condition thereby to stop said drive oscillator, the frequency of said drive oscillator being variable whereby the time duration of the last signal element is adjustable.

References Cited in the file of this patent

UNITED STATES PATENTS

| | | |
|---|---|---|
| 2,373,134 | Massonneau | Apr. 10, 1945 |
| 2,468,462 | Rea | Apr. 26, 1949 |
| 2,626,314 | Coley | Jan. 20, 1953 |

FOREIGN PATENTS

| | | |
|---|---|---|
| 666,699 | Great Britain | Feb. 20, 1952 |